US008319088B1

(12) United States Patent
Harari

(10) Patent No.: US 8,319,088 B1
(45) Date of Patent: Nov. 27, 2012

(54) POLY-COIL MATRIX

(76) Inventor: Nessy Harari, Tel Aviv (IL)

( * ) Notice: Subject to any disclaimer, the term of this patent is extended or adjusted under 35 U.S.C. 154(b) by 0 days.

(21) Appl. No.: 12/906,182

(22) Filed: Oct. 18, 2010

(51) Int. Cl.
*G01H 3/14* (2006.01)

(52) U.S. Cl. ........................................................ 84/727

(58) Field of Classification Search ............. 84/726–728
See application file for complete search history.

(56) References Cited

U.S. PATENT DOCUMENTS

| | | | | |
|---|---|---|---|---|
| 1,645,139 | A | 10/1927 | Harrison | |
| 2,119,584 | A | 6/1938 | Knoblaugh | |
| 4,233,476 | A * | 11/1980 | Ikeda | 369/139 |
| 4,524,667 | A * | 6/1985 | Duncan | 84/728 |
| 4,532,620 | A * | 7/1985 | Matsuda et al. | 369/136 |
| 4,878,412 | A * | 11/1989 | Resnick | 84/726 |
| 5,668,520 | A * | 9/1997 | Kinman | 336/84 R |
| 6,208,742 | B1 | 3/2001 | Garcia et al. | |
| 6,901,150 | B1 * | 5/2005 | Anciant | 381/401 |
| 7,135,638 | B2 * | 11/2006 | Garrett et al. | 84/725 |
| 7,166,793 | B2 * | 1/2007 | Beller | 84/723 |
| 7,729,503 | B2 * | 6/2010 | Young | 381/407 |
| 2002/0092413 | A1 * | 7/2002 | Turner | 84/726 |
| 2005/0162247 | A1 | 7/2005 | Beller | |
| 2009/0052721 | A1 * | 2/2009 | Dabrowski | 381/386 |
| 2009/0154753 | A1 | 6/2009 | Akino | |
| 2010/0101399 | A1 * | 4/2010 | Calvet | 84/726 |
| 2010/0166201 | A1 * | 7/2010 | Shim | 381/71.1 |

FOREIGN PATENT DOCUMENTS

| | | |
|---|---|---|
| EP | 1251715 | 10/2002 |
| EP | 1365498 | 11/2003 |
| GB | 2364594 | 1/2002 |

* cited by examiner

*Primary Examiner* — Jeffrey Donels
(74) *Attorney, Agent, or Firm* — Mark M friedman

(57) ABSTRACT

A poly coil matrix including a poly coil matrix body, a first coil assembly, a second coil assembly concentric with the first coil assembly, one or more magnetic pole accommodated by the first coil assembly.

7 Claims, 11 Drawing Sheets

D

POLY-COIL MATRIX

FIELD OF THE INVENTION

The present invention relates to electronic mechanisms. In particular, the present invention relates to pickups having a plurality of coils.

BACKGROUND OF THE INVENTION

There has long existed the need for an apparatus and system whereby a user can widen or lengthen a pick at will without replacing the entire pickup. This imperative coincides with an added desire to limit the size of pickup due to the confined space available in pickups. This is true in the world of music instruments, stringed musical instruments, speakers and sound systems. This has proven to be especially relevant to those in the field of music and/or sound who requiring a high degree of versatility and clarity of sounds.

The traditional means of producing a pickup, has proven to have a number of significant drawbacks. The more prevalent of these drawbacks include the above-mentioned widen or lengthen a pick at will without replacing the entire pickup.

Many "pickup" inventions and methods now exist to ensure that users can choose between rather a "long" pickup or a "wide" pickup. By way of example only, in the realm of "electric guitars", the most notable styles are those of Gibson™ and Fender™. The present invention introduces a new apparatus and system for achieving a high degree of versatility and sound enhancement.

Thus, such inventions as those described above generally suffer from at least one of several disadvantages, including, amongst others, the lack of an ability to choose modification of pickup style from "wide" to "long" or from "long" to "wide". Therefore, the need exists to create a system whereby the foregoing disadvantages are adequately remedied to provide a modifiable alternative.

SUMMARY OF THE INVENTION

The present invention is a poly coil matrix and system, which is capable of effectively creative a plurality of selections of width and length of the poly coil matrix.

According to preferred embodiments of the present invention, there is provided a poly coil matrix including a poly coil matrix body, a first coil assembly, a second coil assembly substantially concentric with the first coil assembly, and at least one magnetic pole accommodated by the first coil assembly.

According to preferred embodiments of the present invention, the poly-coil matrix is a speaker.

According to further preferred embodiments of the present invention, the poly-coil matrix a poly coil phonograph cartridge.

According to further preferred embodiments of the present invention, the poly-coil matrix is a microphone.

According to preferred embodiments of the present invention, the poly-coil matrix further includes a third coil assembly substantially concentric with the first coil assembly and substantially concentric the second coil assembly.

According to further preferred embodiments of the present invention, there is provided a poly coil pickup including a pickup body, a first coil assembly, a second coil assembly substantially concentric with the first coil assembly, and at least one magnetic pole accommodated by the first coil assembly.

According to still further preferred embodiments of the present invention, the poly-coil pickup is a musical instrument pickup.

According to preferred embodiments of the present invention, the musical instrument poly-coil pickup is a stringed instrument poly-coil pickup.

According to preferred embodiments of the present invention, the poly-coil pickup further includes a third coil assembly substantially concentric with the first coil assembly and substantially concentric the second coil assembly.

DETAILED DESCRIPTION OF THE INVENTION

Figure 1:
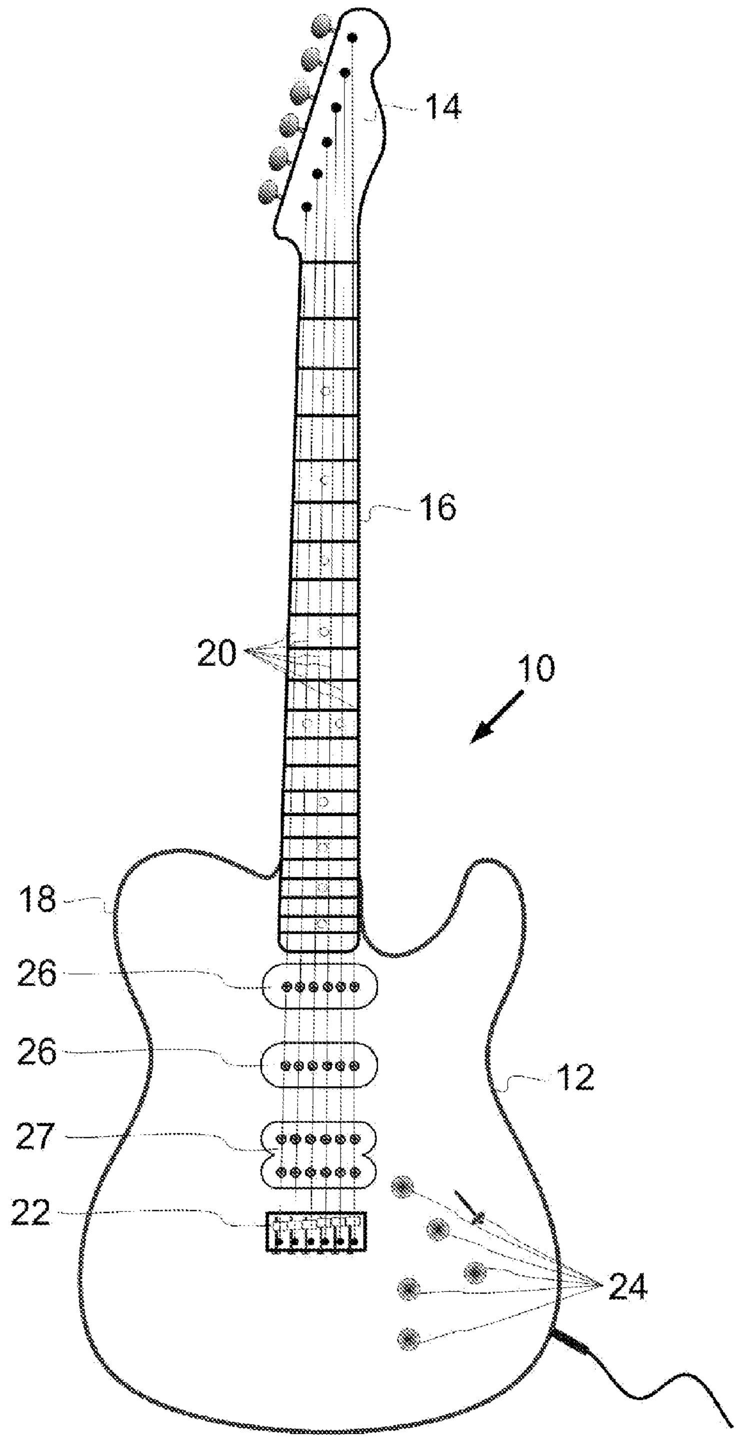
FIG. 1 is a frontal view of a prior art musical instrument.

FIG. 1 shows a plan view of a stringed instrument 10. By way of example only, a solid body electric guitar 12 is shown. Electric guitar 12, which is illustrative of a typical solid-body electric guitar, comprises a headstock 14, a neck 16, and a body 18. Upon reading the teachings of this specification, those of ordinary skill in the art will now understand that, under appropriate circumstances, considering such issues as trends in musician preferences, etc., other stringed instruments, such as, for example, a hollow body electric guitar, a semi-hollow body electric guitar, an electric guitar with more than six strings, e.g., a seven-string electric guitar, a twelve-string electric guitar, etc., an electric guitar with less than six strings, a electric double-neck guitar, a carved-top electric guitar, an arch-top electric guitar, an acoustic-electric guitar, an electric mandolin, an electric violin, an electric banjo, an electric stringed instrument with more than six strings, an electric stringed instrument with less than six strings, etc., may suffice.

Guitar 12 comprises strings 20 which typically comprise steel. Guitar 12, shown in FIG. 1, is commonly referred to as a six-string guitar. Strings 20 of guitar 12 are under tension from headstock 14 to a position on body 18, namely, a bridge 22, as shown. A six-string guitar, comprises six strings ranging in diameter to produce different tones. Each string of strings 20 is tuned to a particular guitarist-desired pitch. Optionally, "one piece" guitars with 16 integrally formed with body 18 are also known.

Optionally, body 18 of guitar 12 comprises at least one electric component 24 for readily assisting in converting mechanical vibration of strings 20 into electrical signals.

Those electrical signals are typically subsequently amplified and sounded through a loud speaker. A guitarist "frets" (i.e., changes the effective string length by pushing the string against the neck) strings 20 and vibrates strings 20 with either the fingers of the guitarist or with a plectrum, also referred to as a "flatpick" or "pick", to perform music with guitar 12. Optionally, the guitarist may choose to use other devices to vibrate strings 20, such as a bow, an electric bow, a hammer (in a piano) and the like.

Electronic components 24 of guitar 12 comprise "pickups" 26, as shown. Pickups are magnetic transducers that induce a current in a wound coil wire positioned adjacent to a magnet. Guitar 12, as shown in FIG. 1, comprises two single coil pickups 26.

By way of example only. Guitar 12 shown in FIG. 1 also includes a "humbucker" pickup 27 including at least two coils.

The term "Humbucker" as used herein, shall include but will riot be limited to: a conventional humbucker (or Humbucking pickup) a Humbucker for readily canceling out the interference (they "buck the hum") induced by alternating current, which is normally experienced with single coil pickups, an electric guitar pickup, first patented by Seth Lover and the Gibson company, using at least two coils, wherein at least one coil generates a string signal, a Humbucker having a high output since both coils are in series and the magnetic circuit is low loss, a humbucker inducing a slight magnetic field around the strings, which in turn induces an electrical current on the coils as the strings vibrate, a humbucker with at least two coils having opposite magnetic polarity, opposite windings and are connected in series or in parallel which causes noise and interference to be significantly reduced via common-mode rejection. Namely, opposite windings brings about an opposite electrical polarity.

A typical guitar 12 comprises at least one pickup 26 and/or "humbucker" pickup 27. Electronic components 24 of guitar 12 are electrically connected to each of pickup 26 in such a way guitar players may select which pickup 26 or combination of pickups 26 will be used. The pickup 26 selection is performed to shape the tone of the guitarists sound and provides an expressive musical component. In operation, the mechanical vibration of strings 20, wherein such strings 20 typically comprising steel or metal, in magnetic-field communication with pickup 26 and/or "humbucker" pickup 27, induces a current in the wound coil wire by affecting the magnetic flux of the adjacent magnet. The induced current signal, when electrically connected to an amplifier, is subsequently amplified. The amplified electric signal may then be sounded through a loud speaker as the electrical signal is converted into a mechanical wave signal.

Figure 2:
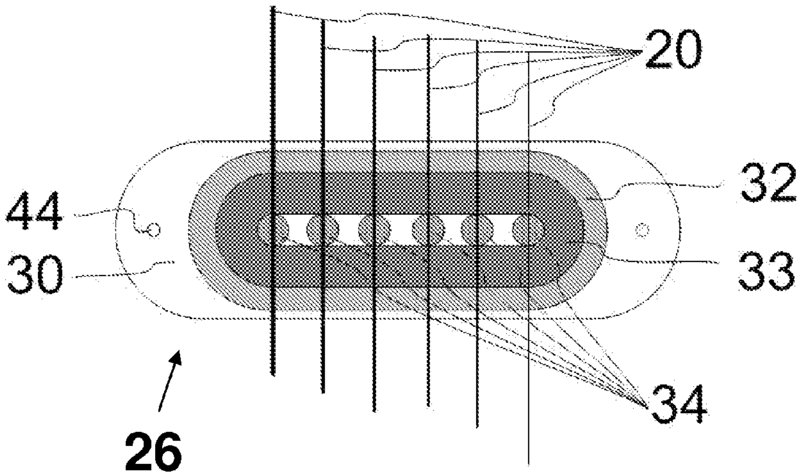
FIG. 2 is a top view of an exemplary pickup according to the present invention.

FIG. 2 shows an exploded view illustrating the components of a preferred poly-coil pickup 26 according to a preferred embodiment of the present invention. Poly-coil pickup 26 preferably includes a bottom flatwork 30, a first coil assembly 32, a second coil assembly 33 at least one pole piece 34 (six are shown), and a top flatwork (not shown in FIG. 2). Optionally, poly-coil pickup 26 may be constructed devoid of either bottom flatwork 30 or top flatwork (not shown in FIG. 2).

Alternatively and by way of example only, six pole pieces 34 may be replaced with a blade magnet assembly, a six screw assembly, a magnetic plate assembly and the like.

As shown, poly-coil pickup 26 is preferably designed to be compatible with the dimensions and sizing of a conventional single-coil pickup for a six-string electric guitar such that poly-coil pickup 26 will fit within a standard single-coil pickup equipped guitar, such as guitar 12 of FIG. 1, without the need for substantial modification.

Upon reading the teachings of this specification, those of ordinary skill in the art will now understand that, under appropriate circumstances, considering such issues as musician preference, future developments in musical pickup design, intended use, etc., other compatible pickup geometries and dimensions, such as a "P90" style pickup, a "Stratocaster" pickup, a "telecaster" pickup, a "full-size" "humbucking" style pickup, a Nano-mag style pickup, etc., may suffice.

Upon reading the teachings of this specification, those of ordinary skill in the art will now understand that, under appropriate circumstances, considering such issues as other desired flatwork dimensions, type of guitar, etc., other aperture diameters, other overall pole piece spacing dimensions, and other spacing between adjacent pole pieces, etc., may suffice.

Bottom flatwork 30 preferably comprises a lead wire aperture 40 for routing at least two lead wire 41 from poly-coil pickup 26 essentially to an output jack of guitar 12. It is noted that lead wire 41 from multiple musical pickup assembly 26 may be internally configured, or "wired", within a stringed instrument in a multitude of ways with other guitar components, such as switches, tone controls, and volume controls, to achieve particular musical tones.

Bottom flatwork 30 also preferably comprises at least one mounting screw aperture 44 to receive a mounting screw to secure bottom flatwork 30 and poly-coil pickup 26 to a musical instrument selected from the group consisting of: a musical instrument that produces sound by means of vibrating strings, chordophones, a guitar, a violin, a viola, a cello, a double bass, a bass guitar, a banjo, a mandolin, a ukulele, a harp, a dulcimer, a fiddle, a sitar, a musical instrument which makes sound by way of a vibrating string or strings stretched between two points, a lyre, a musical bow, a piano, an instrument without a resonator that is an integral part of the instrument, an instruments with such a resonator, a harpsichord, an instrument with a removable resonator, an instrument with at least one string passing over a bridge located on the resonator box, an electric string instrument with an electromagnetic pickup, an overtone koto, an instrument wherein plucking the instrument vibrates at least one string, an instrument with at least one string including a sound reverberation element, an instrument for producing a sound by way of displacing at least one string through plucking (like a harp), strumming (like a guitar), by rubbing with a bow (like a violin or cello), and by striking (like a piano or berimbau) and a musical instrument simulating string instruments such as the "Rhodes" Piano.

Preferably, poly-coil pickup 26 will be height adjustable within musical instrument using art-recognized springs and mounting screws.

Upon reading the teachings of this specification, those of ordinary skill in the art will now understand that, under appropriate circumstances, considering such issues as guitar type, pickup shape, etc., other pickup flatwork designed to fit other guitar types may suffice.

Preferably, first coil assembly 32 is "sandwiched" between top flatwork (not shown in FIG. 2) and bottom flatwork 30, as shown. Preferably, second coil assembly 33 is "sandwiched" between top flatwork (not shown in FIG. 2) and bottom flatwork 30.

Preferably, pole pieces 34 are Alnico V magnets. Preferably, pole pieces 34 are self-magnetized. Alternately, pole pieces 34 may be magnetically-conductive slugs influenced by an auxiliary magnet.

Upon reading the teachings of this specification, those of ordinary skill in the art will now understand that, under appropriate circumstances, considering such issues as tonal preferences, output requirements, etc., other magnetic materials, such as Alnico II magnets, ceramic magnets, etc., may suffice.

Preferably, each individual coil-wire wrapping of first coil assembly 32 is preferably oriented around pole pieces 34, as shown. Upon reading the teachings of this specification, those of ordinary skill in the art will now understand that, under appropriate circumstances, considering such issues as designer preference, tonal quality desired, intended use, etc., other coil wrapping/magnetic pole piece arrangements, such as, having a coil wrapping oriented around more than one magnetic pole piece, such as around two adjacent magnetic pole pieces, around three adjacent magnetic pole pieces, around six adjacent magnetic pole pieces, etc., may suffice.

Poly-coil pickup 26 is preferably wired so as to be in electronic communication with the output jack of the musical instrument.

Preferably, the individual first coil assembly 32 wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

Preferably, the individual second coil assembly 33 wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

The term "stringed instrument" as used herein, shall include, but will not be limited to: a musical instrument that produces sound by means of vibrating strings, chordophones, a guitar, a violin, a viola, a cello, a double bass, a bass guitar, a banjo, a mandolin, a ukulele, a harp, a dulcimer, a fiddle, a sitar, a musical instrument which makes sound by way of a vibrating string or strings stretched between two points, a lyre, a musical bow, a piano, an instrument without a resonator that is an integral part of the instrument, an instruments with such a resonator, a harpsichord, an instrument with a removable resonator, an instrument with at least one string passing over a bridge located on the resonator box, an electric string instrument with an electromagnetic pickup, an overtone koto, an instrument wherein plucking the instrument vibrates at least one string, an instrument with at least one string including a sound reverberation element, an instrument for producing a sound by way of displacing at least one string through plucking (like a harp), strumming (like a guitar), by rubbing with a bow (like a violin or cello), and by striking (like a piano or berimbau) as well as instruments simulating string instruments such as the "Rhodes" Piano and the like.

Preferably, first coil assembly 32 and second coil assembly 33 are configured with the same winding direction (or electron travel) and magnetic polarity.

It is envisaged either first coil assembly 32 or second coil assembly 33 can be configured with winding creating a tapering contact between first coil assembly 32 or second coil assembly 33 thereby bringing about a "smoothness" when selecting a combination of coils selected from the group consisting of: a first coil assembly 32, a second coil assembly 33 and both first coil assembly 32 together with second coil assembly 33.

Figure 3:
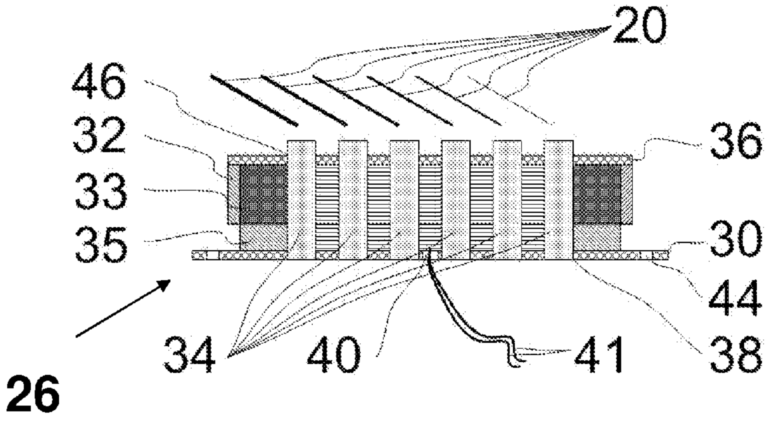
FIG. 3 is a cross sectional view of an exemplary pickup according to the present invention.

FIG. 3 shows a side view illustrating the components of a preferred poly-coil pickup 26 according to a preferred embodiment of the present invention. Poly-coil pickup 26 preferably includes a bottom flatwork 30, a first coil assembly 32, a second coil assembly 33 a six of pole piece 34, and a top flatwork 36. Optionally, poly-coil pickup 26 may be constructed devoid of either bottom flatwork 30 or top flatwork 36.

Alternatively and by way of example only, six pole pieces 34 may be replaced with a blade assembly, a six screw assembly, a magnetic plate assembly and the like.

Optionally, a preferred poly-coil pickup 26 preferably further includes a third coil assembly 35.

Optionally, first coil assembly 32, second coil assembly 33 and third coil assembly 35 are connected in a serial connection.

Optionally, first coil assembly 32 is serially connected to second coil assembly 33 and second coil assembly 33 is serially connected to third coil assembly.

As shown, poly-coil pickup 26 is preferably designed to be compatible with the dimensions and sizing of a conventional single-coil pickup for a six-string electric guitar such that poly-coil pickup 26 will fit within a standard single-coil pickup equipped guitar, such as guitar 12 of FIG. 1, without the need for substantial modification.

Bottom flatwork 30 preferably comprises at least one bottom pole piece apertures 38 formed in bottom flatwork 30. Preferably, bottom pole piece apertures 38 formed in bottom flatwork 30 are arranged in a row, as shown.

Each bottom pole piece aperture 38 formed in bottom flatwork 30 is designed to hold a portion of each pole piece 34 preferably with a friction fit.

Alternatively and preferably, each pole piece 34 may be secured within pole piece aperture 38 formed in bottom flatwork 30 with an adhesive. Each pole piece aperture 38 formed in bottom flatwork 30 has a preferred diameter of substantially between 0.12 inches and 0.28 inches.

Bottom flatwork 30 preferably optionally comprises a lead wire aperture 40. Preferably, lead wire aperture 40 is geared towards routing at least two lead wire 41 from poly-coil pickup 26 essentially to an output jack of guitar 12. As such, lead wire 41 from multiple musical pickup assembly 26 may be internally configured, or "wired", within a stringed instrument in a multitude of ways with other guitar components, such as switches, tone controls, and volume controls, to achieve particular musical tones.

Bottom flatwork 30 also preferably comprises at least one mounting screw to secure bottom flatwork 30 and poly-coil pickup 26 to a musical instrument selected from the group consisting of: a musical instrument that produces sound by means of vibrating strings, chordophones, a guitar, a violin, a viola, a cello, a double bass, a bass guitar, a Banjo, a mandolin, a ukulele, a harp, a dulcimer, a fiddle, a sitar, a musical instrument which makes sound by way of a vibrating string or strings stretched between two points, a lyre, a musical bow, a piano, an instrument without a resonator that is an integral part of the instrument, an instruments with such a resonator, a harpsichord, an instrument with a removable resonator, an instrument with at least one string passing over a bridge located on the resonator box, an electric string instrument with an electromagnetic pickup, an overtone koto, an instrument wherein plucking the instrument vibrates at least one string, an instrument with at least one string including a sound reverberation element, an instrument for producing a sound by way of displacing at least one string through plucking (like a harp), strumming (like a guitar), by rubbing with a bow (like a violin or cello), and by striking (like a piano or berimbau) and a musical instrument simulating string instruments such as the "Rhodes" Piano.

Preferably, poly-coil pickup 26 will be height adjustable within musical instrument using art-recognized springs and mounting screws.

Top flatwork 36 preferably comprises at least one top flatwork aperture 46 formed in top flatwork 36.

Preferably, first coil assembly 32 is "sandwiched" between top flatwork 36 and bottom flatwork 30, as shown. Preferably, second coil assembly 33 is "sandwiched" between top flatwork 36 and bottom flatwork 30, as shown.

Preferably, pole pieces 34 are Alnico V magnets. Preferably, pole pieces 34 are self-magnetized. Alternately, pole pieces 34 may be magnetically conductive slugs influenced by an auxiliary magnet.

Preferably, each individual coil-wire wrapping of first coil assembly 32 is preferably oriented around pole pieces 34, as shown. Upon reading the teachings of this specification, those of ordinary skill in the art will now understand that, under appropriate circumstances, considering such issue as designer preference, tonal quality desired, intended use, etc., other coil wrapping/magnetic pole piece arrangements, such as, having a coil wrapping oriented around more than one magnetic pole piece, such as around two adjacent magnetic pole pieces, around three adjacent magnetic pole pieces, around six adjacent magnetic pole pieces, etc., may suffice.

Poly-coil pickup 26 is preferably wired so as to be in electronic communication with the output jack of the musical instrument.

Preferably, the individual first coil assembly 32 wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

Preferably, the individual second coil assembly 33 wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

Preferably, first coil assembly 32 and second coil assembly 33 are configured with the same winding direction (or electron travel) and magnetic polarity.

Optionally, a preferred poly-coil pickup 26 preferably further includes a third coil assembly 35.

Optionally, first coil assembly 32, second coil assembly 33 and third coil assembly 35 are connected in a serial connection.

Optionally, first coil assembly 32 is serially connected to second coil assembly 33 and second coil assembly 33 is serially connected to third coil assembly.

Upon reading the teachings of this specification, those of ordinary skill in the art will now understand that, under appropriate circumstances, considering such issues as musician preference, future developments in musical pickup design, intended use, etc., other compatible pickup geometries and dimensions, such as a "P90" style pickup, a "Stratocaster" pickup, a "telecaster" pickup, a "full-size" "humbucking" style pickup, a Nano-mag style pickup, etc., may suffice.

Figure 4:
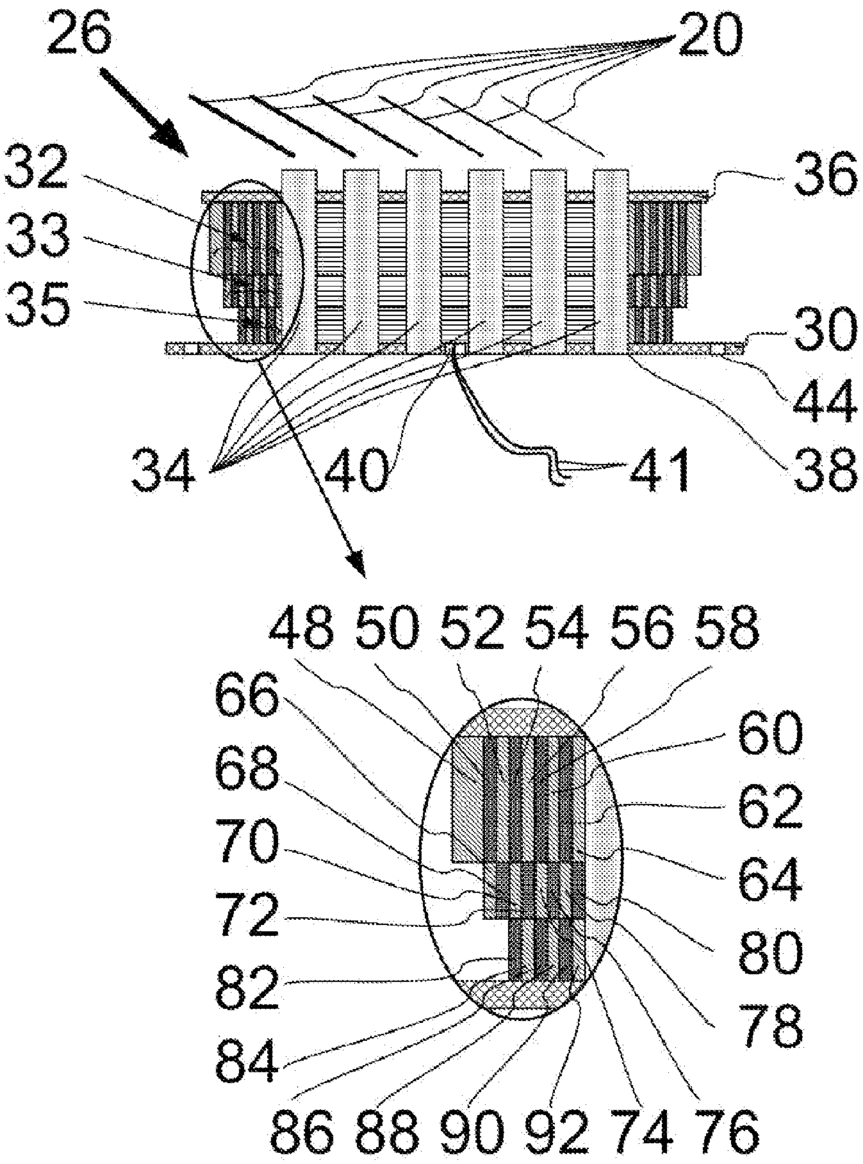
FIG. 4 is a cross sectional view of a further embodiment of a poly coil pickup of the present invention.

FIG. 4 shows an exploded view illustrating the components of a preferred poly-coil pickup 26 according to a preferred embodiment of the present invention. Poly-coil pickup 26 preferably includes a bottom flatwork 30, a first coil assembly 32, a second coil assembly 33 at least one pole piece 34 (six are shown), and a top flatwork 36. Optionally, poly-coil pickup 26 may be constructed devoid of either bottom flatwork 30 or top flatwork 36.

Alternatively and by way of example only, six pole pieces 34 may be replaced with a blade assembly, a six screw assembly, a magnetic plate assembly and the like.

Optionally, a preferred poly-coil pickup 26 preferably further includes a third coil assembly 35.

Optionally, first coil assembly 32, second coil assembly 33 and third coil assembly 35 are connected in a serial connection.

Optionally, first coil assembly 32 is serially connected to second coil assembly 33 and second coil assembly 33 is serially connected to third coil assembly.

As shown, poly-coil pickup 26 is preferably designed to be compatible with the dimensions and sizing of a conventional single-coil pickup for a six-string electric guitar such that poly-coil pickup 26 will fit within a standard single-coil pickup equipped guitar, such as guitar 12 of FIG. 1, without the need for substantial modification.

Bottom flatwork 30 preferably comprises at least one bottom pole piece apertures 38 formed in bottom flatwork 30. Preferably, bottom pole piece apertures 38 formed in bottom flatwork 30 are arranged in a row, as shown.

Each bottom pole piece aperture 38 formed in bottom flatwork 30 is designed to hold a portion of each pole piece 34 preferably with a friction fit.

Alternatively and preferably, each pole piece 34 may be secured within pole piece aperture 38 formed in bottom flatwork 30 with an adhesive. Each pole piece aperture 38 formed in bottom flatwork 30 has a preferred diameter of substantially between 0.12 inches and 0.28 inches.

Bottom flatwork 30 preferably comprises a lead wire aperture 40 for routing at least two lead wire 41 from poly-coil pickup 26 essentially to an output jack of guitar 12. It is noted that lead wire 41 from multiple musical pickup assembly 26 may be internally configured, or "wired", within a stringed instrument in a multitude of ways with other guitar components, such as switches, tone controls, and volume controls, to achieve particular musical tones.

Bottom flatwork 30 also preferably comprises at least one mounting screw to secure bottom flatwork 30 and poly-coil pickup 26 to a musical instrument selected from the group consisting of: a musical instrument that produces sound by means of vibrating strings, chordophones, a guitar, a violin, a viola, a cello, a double bass, a bass guitar, a banjo, a mandolin, a ukulele, a harp, a dulcimer, a fiddle, a sitar, a musical instrument which makes sound by way of a vibrating string or strings stretched between two points, a lyre, a musical bow, a piano, an instrument without a resonator that is an integral part of the instrument, an instruments with such a resonator, a harpsichord, an instrument with a removable resonator, an instrument with at least one string passing over a bridge located on the resonator box, an electric string instrument with an electromagnetic pickup, an overtone koto, an instrument wherein plucking the instrument vibrates at least one string, an instrument with at least one string including a sound reverberation element, an instrument for producing a sound by way of displacing at least one string through plucking (like a harp), strumming (like a guitar), by rubbing with a bow (like a violin or cello), and by striking (like a piano or berimbau) and a musical instrument simulating string instruments such as the "Rhodes" Piano.

Preferably, poly-coil pickup 26 will be height adjustable within musical instrument using art-recognized springs and mounting screws.

Upon reading the teachings of this specification, those of ordinary skill in the art will now understand that, under appropriate circumstances, considering such issues as guitar type, pickup shape, etc., other pickup flatwork designed to fit other guitar types may suffice.

Preferably, first coil assembly 32 is "sandwiched" between top flatwork 36 and bottom flatwork 30, as shown. Preferably, second coil assembly 33 is "sandwiched" between top flatwork 36 and bottom flatwork 30, as shown.

Preferably, pole pieces 34 are Alnico V magnets. Preferably, pole pieces 34 are self-magnetized. Alternately, pole pieces 34 may be magnetically-conductive slugs influenced by an auxiliary magnet.

Preferably, each individual coil-wire wrapping of first coil assembly 32 is preferably oriented around pole pieces 34, as shown. Upon reading the teachings of this specification, those of ordinary skill in the art will now understand that, under appropriate circumstances, considering such issues as designer preference, tonal quality desired, intended use, etc., other coil wrapping/magnetic pole piece arrangements, such as, having a coil wrapping oriented around more than one magnetic pole piece, such as around two adjacent magnetic pole pieces, around three adjacent magnetic pole pieces, around six adjacent magnetic pole pieces, etc., may suffice.

Poly-coil pickup 26 is preferably wired so as to be in electronic communication with the output jack of the musical instrument.

Preferably, the individual first coil assembly 32 wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

Preferably, the individual second coil assembly 33 wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

Preferably, first coil assembly 32 and second coil assembly 33 are configured with the same winding direction (or electron travel) and magnetic polarity.

Optionally and as shown in FIG. 4, a plurality of coils are shown in a first horizontal matrix of concentric coils (48, 50, 52, 54, 56, 58, 60, 62, 64), a second horizontal matrix of concentric coils (66, 68, 70, 72, 74, 78, 80) and a third horizontal matrix of concentric coils (82, 84, 86, 88, 90, 92).

Optionally, "stacking" to create a three dimensional matrix of coils can readily be achieved by stacking at least two layers selected from the group consisting of: a first horizontal matrix of concentric coils (48, 50, 52, 54, 56, 58, 60, 62, 64), a second horizontal matrix of concentric coils (66, 68, 70, 72, 74, 78, 80) and a third horizontal matrix of concentric coils (82, 84, 86, 88, 90, 92).

It is envisaged that within the scope of the embodiments of the present invention, the number of coils shown in first horizontal matrix of concentric coils (48, 50, 52, 54, 56, 58, 60, 62, 64), and/or second horizontal matrix of concentric coils (66, 68, 70, 72, 74, 78, 80) and/or third horizontal matrix of concentric coils (82, 84, 86, 88, 90, 92) can be increased or decreased according to user preference, manufacturer and the like.

It is further envisaged that a selection can be made of a coil within first horizontal matrix of concentric coils (48, 50, 52, 54, 56, 58, 60, 62, 64), second horizontal matrix of concentric coils (66, 68, 70, 72, 74, 78, 80) or third horizontal matrix of concentric coils (82, 84, 86, 88, 90, 92) which can be configured with winding creating a tapering contact between the coils selected from the group consisting of: a first horizontal matrix of concentric coils (48, 50, 52, 54, 56, 58, 60, 62, 64), a second horizontal matrix of concentric coils (66, 68, 70, 72, 74, 78, 80) and a third horizontal matrix of concentric coils (82, 84, 86, 88, 90, 92). Thus, such a selection can readily facilitated a "smoothness" when selecting a combination of coils.

Upon reading the teachings of this specification, those of ordinary skill in the art will now understand that, under appropriate circumstances, considering such issues as musician preference, future developments in musical pickup design, intended use, etc., other compatible pickup geometries and dimensions, such as a "P90" style pickup, a "Stratocaster" pickup, "telecaster" pickup, a "full-size" "humbucking" style pickup, a Nano-mag style pickup, etc., may suffice.

Figure 5:
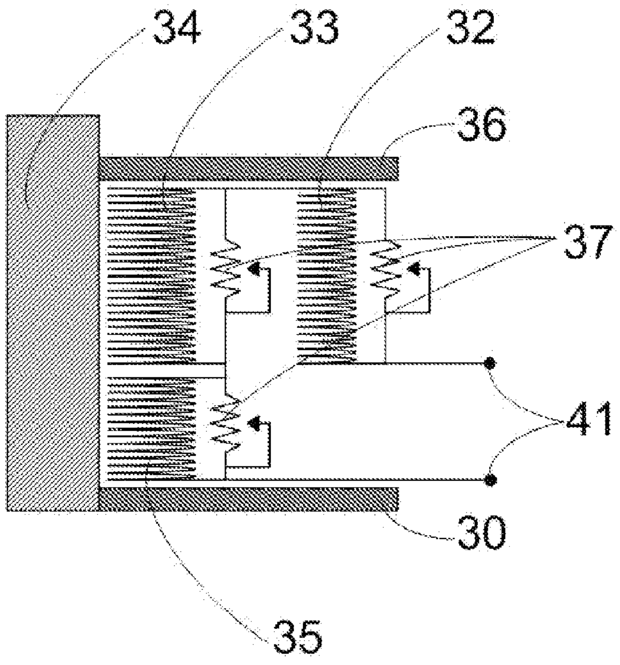
FIG. 5 is a schematic view of an exemplary pickup according to the present invention.

FIG. 5 shows an illustration the components of a preferred poly-coil matrix according to a preferred embodiment of the present invention. Poly-coil matrix preferably includes a bottom flatwork 30, a first coil assembly 32, a second coil assembly 33, at least one pole piece 34, and a top flatwork 36. Optionally, poly-coil matrix may be constructed devoid of either bottom flatwork 30 or top flatwork 36.

Alternatively and by way of example only, at least one pole piece 34 may be replaced with a blade assembly, a six screw assembly, a magnetic plate assembly and the like.

As shown, poly-coil matrix is preferably designed to be compatible with the dimensions and sizing of a conventional single-coil pickup for a six-string electric guitar such that poly-coil matrix will fit within a standard single-coil pickup equipped guitar, such as guitar 12 of FIG. 1, without the need for substantial modification.

Bottom flatwork 30 preferably comprises at least one bottom pole piece apertures 38 formed in bottom flatwork 30. Preferably, bottom pole piece apertures 38 formed in bottom flatwork 30 are arranged in a row, as shown.

Each bottom pole piece aperture 38 formed in bottom flatwork 30 is designed to hold a portion of each pole piece 34 preferably with a friction fit.

Alternatively and preferably, each pole piece 34 may be secured within pole piece aperture 38 formed in bottom flatwork 30 with an adhesive. Each pole piece aperture 38 formed in bottom flatwork 30 has a preferred diameter of substantially between 0.12 inches and 0.28 inches.

Bottom flatwork 30 preferably comprises a lead wire aperture 40 for routing at least two lead wire 41 from poly-coil matrix essentially to an output jack of guitar 12. It is noted that lead wire 41 from multiple musical pickup assembly 26 may be internally configured, or "wired", within a stringed instrument in a multitude of ways with other guitar components, such as switches, tone controls, and volume controls, to achieve particular musical tones.

Bottom flatwork 30 also preferably comprises at least one mounting screw aperture 44 to receive a mounting screw to secure bottom flatwork 30 and poly-coil matrix to a musical instrument selected from the group consisting of: a musical instrument that produces sound by means of vibrating strings, chordophones, a guitar, a violin, a viola, a cello, a double bass, a bass guitar, a banjo, a mandolin, a ukulele, a harp, a dulcimer, a fiddle, a sitar, a musical instrument which makes sound by way of a vibrating string or strings stretched between two points, a lyre, a musical bow, a piano, an instrument without a resonator that is an integral part of the instrument, an instruments with such a resonator, a harpsichord, an instrument with a removable resonator, an instrument with at least one string passing over a bridge located on the resonator box, an electric string instrument with an electromagnetic pickup, an overtone koto, an instrument wherein plucking the instrument vibrates at least one string, an instrument with at least one string including a sound reverberation element, an instrument for producing a sound by way of displacing at least one string through plucking (like a harp), strumming (like a guitar), by rubbing with a bow (like a violin or cello), and by striking (like a piano or berimbau) and a musical instrument simulating string instruments such as the "Rhodes" Piano.

Preferably, poly-coil matrix will be height adjustable within musical instrument using art-recognized springs and mounting screws.

Top flatwork 36 preferably comprises at least one top flatwork aperture 46 formed in top flatwork 36.

Upon reading the teachings of this specification, those of ordinary skill in the art will now understand that, under appropriate circumstances, considering such issues as guitar type, pickup shape, etc., other pickup flatwork designed to fit other guitar types may suffice.

Preferably, first coil assembly 32 is "sandwiched" between top flatwork 36 and bottom flatwork 30, as shown. Preferably, second coil assembly 33 is "sandwiched" between top flatwork 36 and bottom flatwork 30, as shown.

Preferably, pole pieces 34 are Alnico V magnets. Preferably, pole pieces 34 are self-magnetized. Alternately, pole pieces 34 may be magnetically-conductive slugs influenced by an auxiliary magnet.

Preferably, each individual coil-wire wrapping of first coil assembly 32 is preferably oriented around pole pieces 34, as shown. Upon reading the teachings of this specification, those of ordinary skill in the art will now understand that, under appropriate circumstances, considering such issues as designer preference, tonal quality desired, intended use, etc., other coil wrapping/magnetic pole piece arrangements, such as, having a coil wrapping oriented around more than one magnetic pole piece, such as around two adjacent magnetic pole pieces, around three adjacent magnetic pole pieces, around six adjacent magnetic pole pieces, etc., may suffice.

Poly-coil matrix is preferably wired so as to be in electronic communication with the output jack of the musical instrument.

Preferably, a first "bridging" control 37 is provided to readily control the coil gain in the poly coil matrix.

Preferably, the individual first coil assembly 32 wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

Preferably, the individual second coil assembly 33 wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

Preferably, first coil assembly 32, second coil assembly 33 and third coil assembly 35 are configured with the same winding direction (or electron travel) and magnetic polarity.

Upon reading the teachings of this specification, those of ordinary skill in the art will now understand that, under appropriate circumstances, considering such issues as musician preference, future developments in musical pickup design, intended use, etc., other compatible pickup geometries and dimensions, such as a "P90" style pickup, a "Stratocaster" pickup, a "telecaster" pickup, a "full-size" "humbucking" style pickup, a Nano-mag style pickup, etc., may suffice.

Figure 6A:
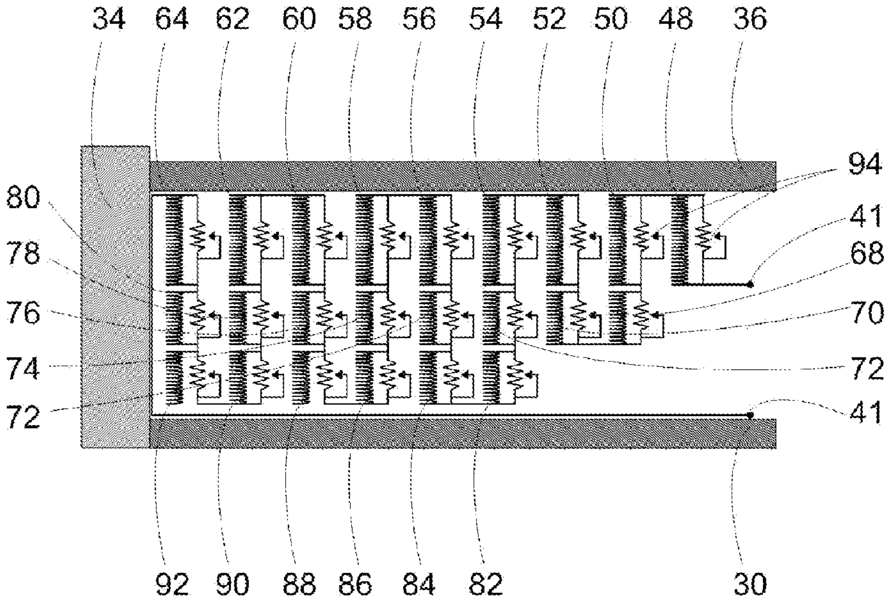
FIG. 6A is a schematic view of a further embodiment of a poly coil pickup according to the present invention.
Figure 6B:
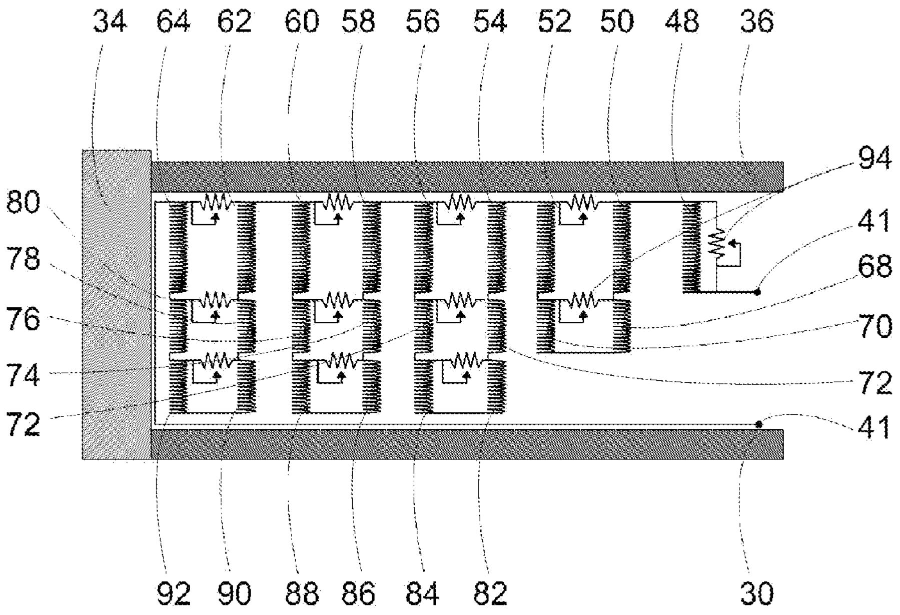
FIG. 6B is a schematic view of a still further embodiment of a poly coil pickup according to the present invention.

FIGS. 6A and 6B show an illustration of the components of a preferred poly-coil matrix according to a preferred embodiment of the present invention. Poly-coil matrix preferably includes at least one pole piece 34, and a top flatwork 36. Optionally, poly-coil matrix may be constructed devoid of either bottom flatwork 30 or top flatwork 36.

Alternatively and by way of example only, at least one pole piece 34 may be replaced with a blade assembly, a six screw assembly, a magnetic plate assembly and the like.

As shown, poly-coil matrix is preferably designed to be compatible with the dimensions and sizing of a conventional single-coil pickup for a six-string electric guitar such that poly-coil matrix will fit within a standard single-coil pickup equipped guitar, such as guitar 12 of FIG. 1, without the need for substantial modification.

Preferably and similarly to first "bridging" control 37 of FIG. 5, a second "bridging" control 94 is provided to readily control the coil gain in the poly coil matrix.

It is envisaged that either first "bridging" control 37 of FIG. 5, second "bridging" control 94 of FIGS. 6A and 6B or both first "bridging" control 37 of FIG. 5 and second "bridging" control 94 of FIGS. 6A and 6B are situated in a location selected from the group consisting of: within poly coil matrix, externally to poly coil matrix or in adjacency to poly coil matrix.

Each bottom pole piece aperture 38 formed in bottom flatwork 30 is designed to hold a portion of each pole piece 34 preferably with a friction fit.

Alternatively and preferably, each pole piece 34 may be secured within pole piece aperture 38 formed in bottom flatwork 30 with an adhesive.

Bottom flatwork 30 preferably comprises a lead wire aperture 40 for routing at least two lead wire 41 from poly-coil matrix essentially to an output jack of guitar 12. It is noted that lead wire 41 from multiple musical pickup assembly 26 may be internally configured, or "wired", within a stringed instrument in a multitude of ways with other guitar components, such as switches, tone controls, and volume controls, to achieve particular musical tones.

Bottom flatwork 30 also preferably comprises at least one mounting screw aperture 44 to receive a mounting screw to secure bottom flatwork 30 and poly-coil matrix to a musical instrument selected from the group consisting of: a musical instrument that produces sound by means of vibrating strings, chordophones, a guitar, a violin, a viola, a cello, a double bass, a bass guitar, a banjo, a mandolin, a ukulele, a harp, a dulcimer, a fiddle, a sitar, a musical instrument which makes sound by way of a vibrating string or strings stretched between two points, a lyre, a musical bow, a piano, an instrument without a resonator that is an integral part of the instrument, an instruments with such a resonator, a harpsichord, an instrument with a removable resonator, an instrument with at least one string passing over a bridge located on the resonator box, an electric string instrument with an electromagnetic pickup, an overtone koto, an instrument wherein plucking the instrument vibrates at least one string, an instrument with at least one string including a sound reverberation element, an instrument for producing a sound by way of displacing at least one string through plucking (like a harp), strumming (like a guitar), by rubbing with a bow (like a violin or cello), and by striking (like a piano or berimbau) and a musical instrument simulating string instruments such as the "Rhodes" Piano.

Preferably, poly-coil matrix will be height adjustable within musical instrument using art-recognized springs and mounting screws.

Upon reading the teachings of this specification, those of ordinary skill in the art will now understand that, under appropriate circumstances, considering such issues as guitar type, pickup shape, etc., other pickup flatwork designed to fit other guitar types may suffice.

Preferably, pole pieces 34 are Alnico V magnets. Preferably, pole pieces 34 are self-magnetized. Alternately, pole pieces 34 may be magnetically conductive slugs influenced by an auxiliary magnet.

Preferably, each individual coil-wire wrapping of a coil assembly is preferably oriented around pole pieces 34, as shown. Upon reading the teachings of this specification, those of ordinary skill in the art will now understand that, under appropriate circumstances, considering such issues as designer preference, tonal quality desired, intended use, etc., other coil wrapping/magnetic pole piece arrangements, such as, having a coil wrapping oriented around more than one magnetic pole piece, such as around two adjacent magnetic pole pieces, around three adjacent magnetic pole pieces, around six adjacent magnetic pole pieces, etc., may suffice.

Poly-coil matrix is preferably wired so as to be in electronic communication with the output jack of the musical instrument.

Preferably, the individual coil assembly wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

Preferably, the individual coil assembly wire wrappings are wired in series. Upon reading the teachings of this specification, those of ordinary skill in the art will now understand that, under appropriate circumstances, considering such issues as user preference, intended use, desired tone, noise cancellation, etc., other wiring arrangements, such as wiring each coil wrapping in parallel, wiring groups of coil wrappings in series, wiring in parallel groups of coil wrapping wired in series with other groups of coil wrapping wired in series, etc., may suffice.

Preferably, coil assemblies are configured with the same winding direction (or electron travel) and magnetic polarity.

Pickups do not sense the string at a single point source, but rather over an area due to the width of the magnetic field. This sensing area is called the "aperture" of the pickup and is about 0.75 inches wide on a thin single coil pickup and about 2 inches wide on a wider pickup such as the Gibson humbucker.

Optionally and as shown in FIGS. 6A and 6B, a plurality of coils are shown in a first horizontal matrix of concentric coils (48, 50, 52, 54, 56, 58, 60, 62, 64), a second horizontal matrix of concentric coils (66, 68, 70, 72, 74, 78, 80) and a third horizontal matrix of concentric coils (82, 84, 86, 88, 90, 92).

Optionally, "stacking" to create a three dimensional matrix of coils can readily be achieved by stacking at least two layers selected from the group consisting of: a first horizontal matrix of concentric coils (48, 50, 52, 54, 56, 58, 60, 62, 64), a second horizontal matrix of concentric coils (66, 68, 70, 72, 74, 78, 80) and a third horizontal matrix of concentric coils (82, 84, 86, 88, 90, 92).

It is envisaged that many alternate "bridging" and connection combinations and/or controlling the coil gain in the poly coil matrix are facilitated within the spirit and scope of the invention beyond the options depicted in FIGS. 6A and 6B thereby creating a wide range of coil length and/or width. Thus, the poly coil matrix can readily bring about depth, density, sound resolution and clarity transcending those known in the art.

Upon reading the teachings of this specification, those of ordinary skill in the art will now understand that, under appropriate circumstances, considering such issues as musician preference, future developments in musical pickup design, intended use, etc., other compatible pickup geometries and dimensions, such as a "P90" style pickup, a "Stratocaster" pickup, a "telecaster" pickup, a "full-size" "humbucking" style pickup, a Nano-mag style pickup, etc., may suffice.

Figure 7:
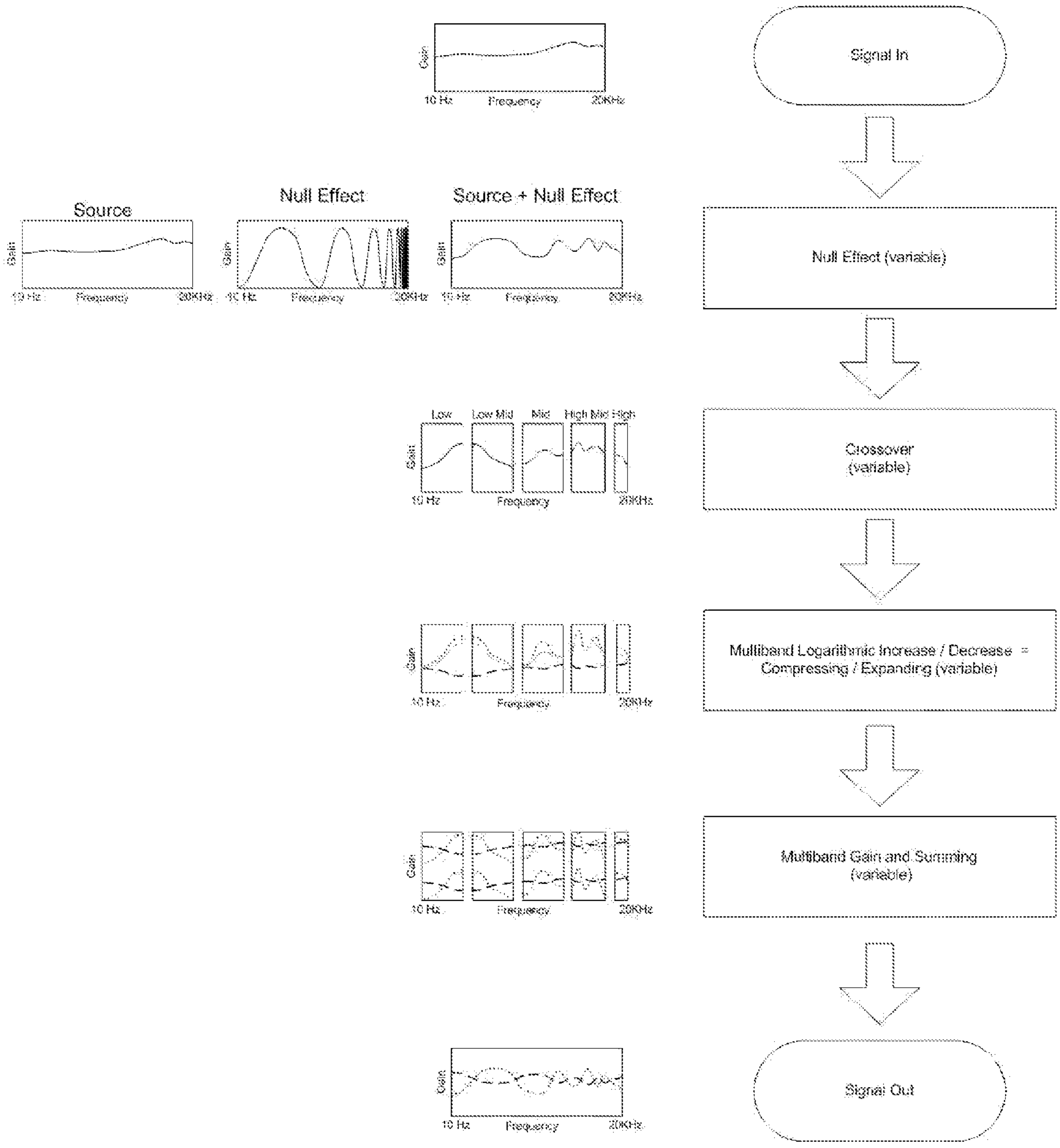
FIG. 7 is a flow chart with graphic illustration of changes in sound when using an exemplary poly coil pickup according to the present invention.

FIG. 7 shows the effect of the pickup aperture on the response can be calculated by averaging the point response over the aperture length. The pickup sensitivity will be greater in the middle than at the ends and the calculation brought herein is according to the average of sensitivity.

The poly coil matrix can readily bring about depth, density, sound resolution and clarity transcending those known previously. Optionally and as shown in FIG. 7, the multiband logarithmic increase/decrease (compressing and expanding) bring about an enhancement of the unique properties of the poly coil matrix according to the present invention.

The methodology of using the flowchart with the accompanying formulas can readily achieve ranges, which would be impossible with physical poly coil matrix systems.

Thus, changes in specific segments can readily be achieved. Thus, digital and/or analog manipulation of poly coil matrix systems can yield surprising and even newer results of combining multiple capabilities into a single "sound".

Attempts have been made to do so with the human voice to obtain a multiple octave voice.

In the movie "Farinelli" separate recordings of a single piece by a plurality of singers were digitally melded together to produce a sound exceeding in range of Carlo Maria Broschi's voice as a "castrato" at an unequalled quality ever heard before.

Analogously, using the flow chart and formulas herein, a "melded" sound with the best qualities of both "long" and "wide" pickups can be simulated.

$$V_{widepickup} = \frac{1}{W_{pickup}} \int_{x=X_{pickup}-\frac{1}{2}W_{pickup}}^{X_{pickup}+\frac{1}{2}W_{pickup}} \sin\left(\frac{\pi F_{string} x}{L_{scale} F_{open}}\right) dx$$

Where:

$W_{widepickup}$ is the width of the wide pickup in inches.

Performing the integration:

$$V_{widepickup} = \frac{L_{scale} F_{open}}{\pi F_{string}} \left[ -\cos\left(\frac{\pi F_{string}\left(X_{pickup} + \frac{1}{2} W_{pickup}\right)}{L_{scale} F_{open}}\right) + \cos\left(\frac{\pi F_{string}\left(X_{pickup} - \frac{1}{2} W_{pickup}\right)}{L_{scale} F_{open}}\right)\right]$$

Given the classic geometric equality:

$$\cos(a+b) = \cos(a)\cos(b) - \sin(a)\sin(b)$$

Figure 8:
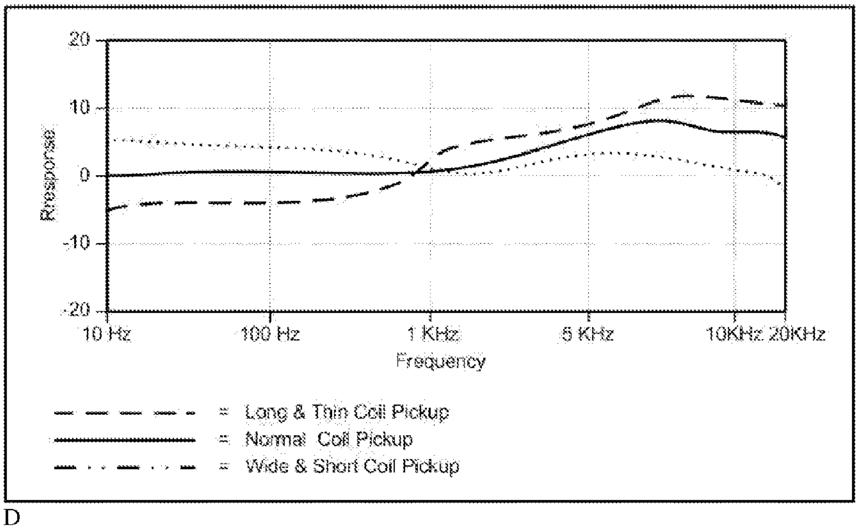
FIG. 8 is a chart including the range capabilities of an exemplary pickup according to the present invention.

Thus, according to FIG. 8, a user create a sound selected from the group of sounds between the "wide" pickup line and the "long" pickup line by using the formulas listed herein. It is envisaged that a person skilled in the art will be readily able to extrapolate and interpolate these results according to the teachings of the present invention as brought herein.

Figure 9:
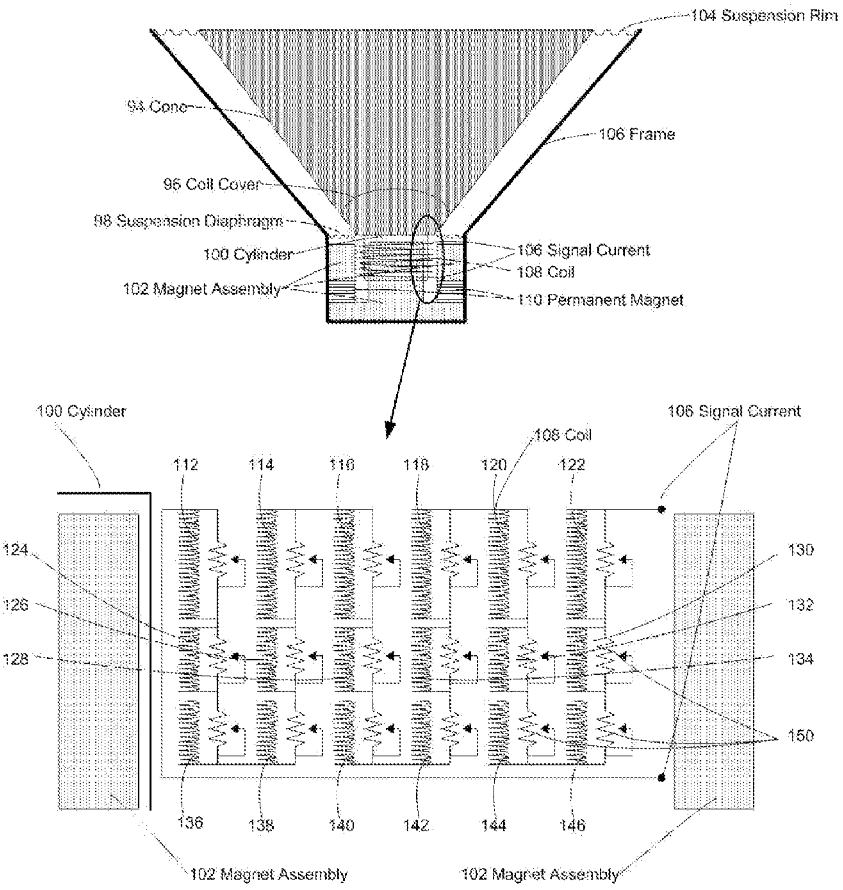
FIG. 9 is a schematic view of an embodiment of a poly coil speaker system according to the present invention.

As can be seen in FIG. 9, the poly coil mechanism can be readily used with speaker systems. Thus, as opposed to the poly coil pickup systems, the poly coil speaker system as shown in FIG. 9 is geared towards producing a wide range of sound by readily controlling the overall "length" and "width" of the coils within the speaker system of the present invention.

As shown in FIG. 9, a cone 94 with a coil cover 96 are attached to, or integrally formed with, a suspension diaphragm 98 and cylinder 100. Similarly to speakers known in the art, a magnet assembly 102 and permanent magnet 110 are provided.

Preferably, cone 94 is accommodated by a frame 106 and a suspension rim 104. A signal current is used with a plurality of concentric coils 108.

By way of example only, a plurality of coils are shown in a first horizontal matrix of concentric coils (112, 114, 116, 118, 120, 122) a second horizontal matrix of concentric coils (124, 126, 128, 130, 132, 134) and a third horizontal matrix of concentric coils (136, 138, 140, 142, 144, 146).

Optionally, "stacking" to create a three dimensional matrix of coils can readily be achieved by stacking at least two layers selected from the group consisting of: a first horizontal matrix of concentric coils (112, 114, 116, 118, 120, 122), a second horizontal matrix of concentric coils (124, 126, 128, 130, 132, 134) and a third horizontal matrix of concentric coils (136, 138, 140, 142, 144, 146).

It is further envisaged that a selection can be made of a coil within first horizontal matrix of concentric coils (112, 114, 116, 118, 120, 122), second horizontal matrix of concentric coils (124, 126, 128, 130, 132, 134) and third horizontal matrix of concentric coils (136, 138, 140, 142, 144, 146) which can be configured with winding creating a tapering contact between the coils selected from the group consisting of: first horizontal matrix of concentric coils (112, 114, 116, 118, 120, 122), a second horizontal matrix of concentric coils (124, 126, 128, 130, 132, 134) and a third horizontal matrix of concentric coils (136, 138, 140, 142, 144, 146). Thus, such a selection can readily facilitated a "smoothness" when selecting a combination of coils.

It is envisaged that a third "bridging" control 150 is situated in a location selected from the group consisting of: within poly coil matrix, externally to poly coil matrix or in adjacency to poly coil matrix.

Analogously, it is envisaged to use the present invention as a Dynamic microphone. Dynamic microphones work via electromagnetic induction. Commonly, Dynamic microphones are robust, relatively inexpensive and resistant to moisture as well as their potentially high gain before feedback makes them ideal for on-stage use. The use of a poly coil matrix dynamic microphone would further enhance sound pickup.

Moving-coil microphones use the same dynamic principle as in a loudspeaker of FIG. 9, only reversed. A plurality of displaceable induction coils, positioned in the magnetic field of a permanent magnet, are attached to the diaphragm. When sound enters through the windscreen of the poly coil dynamic microphone, the sound wave moves the diaphragm. When the diaphragm vibrates, the poly coils move in the magnetic field, producing a varying current in the coil through electromagnetic induction.

Figure 10A:
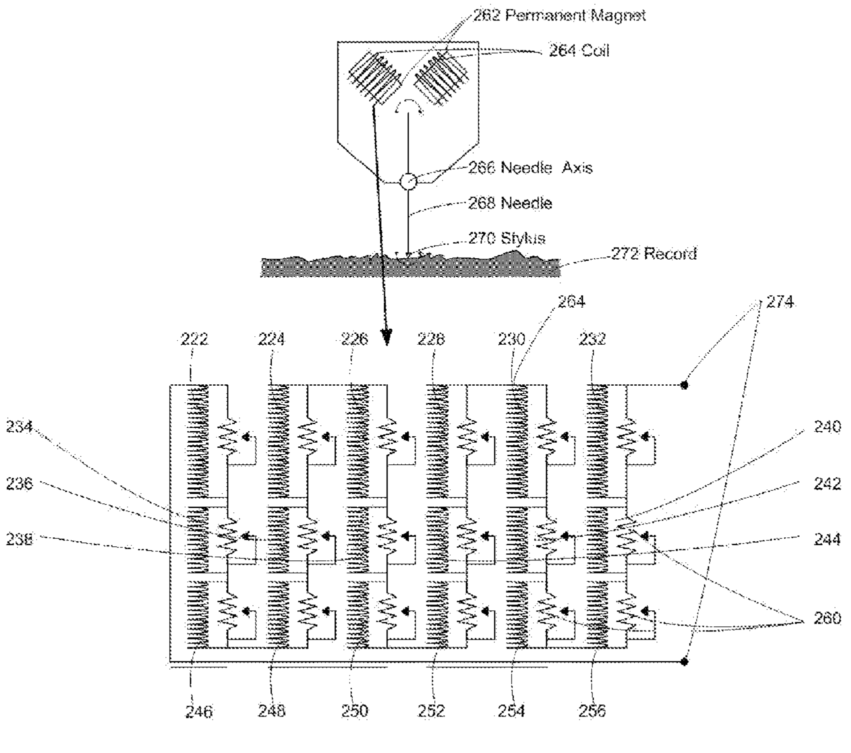
FIG. 10A is a schematic view of an embodiment of a poly coil phonograph cartridge according to the present invention.
Figure 10B:
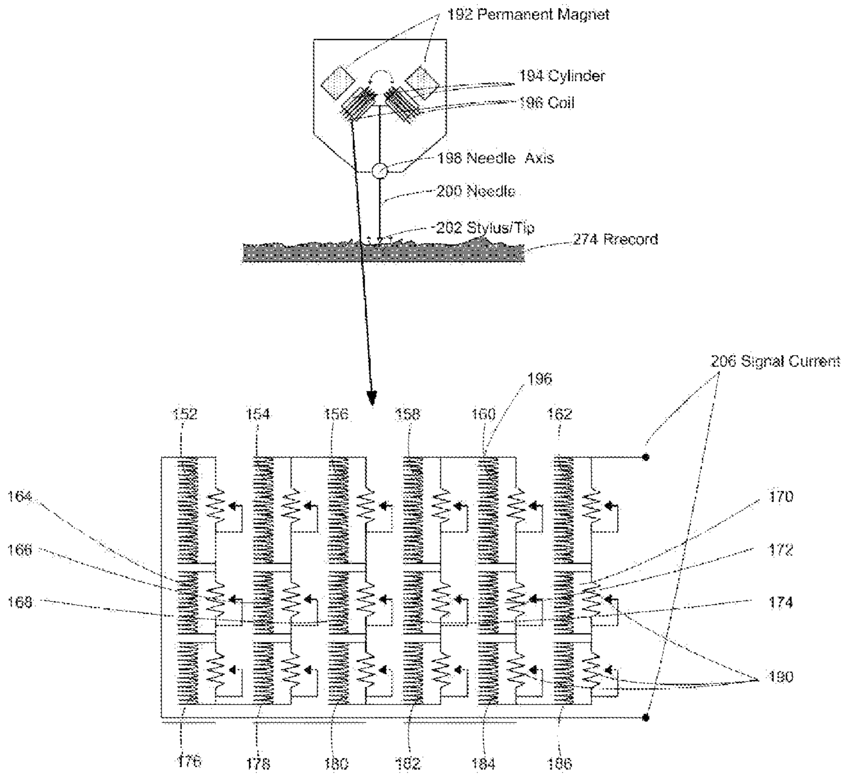
FIG. 10B is a schematic view of a further embodiment of a poly coil phonograph cartridge according to the present invention.

As can be seen in FIGS. 10A and 10B, the poly coil mechanism can be readily used with phonograph cartridges. Thus, as opposed to the poly coil pickup systems, the poly coil speaker system as shown in FIG. 10A is geared towards producing a wide range of sound by readily controlling the Overall "length" and "width" of the coils within the phonograph cartridge system of the present invention.

As can be seen in FIGS. 10A and 10B the use of a poly coil mechanism according to the present invention is readily achieved in both "moving coil" phonograph cartridges and "moving magnet" phonograph cartridges in which the needle is readily pivotally displaced on the needle axis, thereby altering the field of the poly coils and producing the enhanced sound.

It is envisaged that either a fourth "bridging" control 260 of FIG. 10A, a fifth "bridging" control 190 of FIG. 10B or both fourth "bridging" control 260 of FIG. 10A and second "bridging" control 190 of FIG. 10B are situated in a location selected from the group consisting of: within poly coil matrix, externally to poly coil matrix or in adjacency to poly coil matrix.

It will be appreciated that the above descriptions are intended to only serve as examples, and that many other embodiments are possible within the spirit and scope of the present invention.

What is claimed is:

1. An adjustable pickup coil matrix comprising:

a coil matrix having a plurality of selections of coils of differing effective heights and widths;

at least one contiguous magnetic pole electromagnetically associated with said coil matrix; and a bridging control means, wherein said bridging control means are used to create a plurality of selections of said coil matrix heights and widths used to vary said adjustable pickup coil matrix sound response.

2. The adjustable pickup coil matrix of claim 1, wherein said adjustable pickup coil matrix sound response is created by controlled summation of sound responses received from said plurality of coil matrix heights and widths, and wherein said bridging control means are used to include in said summation sound responses received from selected parts of said plurality of coil matrix heights and widths.

3. The adjustable pickup coil matrix of claim 1, wherein said adjustable pickup coil matrix is a stringed musical instrument's adjustable pickup coil.

4. The adjustable pickup coil matrix of claim 1, wherein said adjustable pickup coil matrix is a non stringed musical instrument's adjustable pickup coil.

5. The adjustable pickup coil matrix of claim 1, further comprising a diaphragm, and wherein said adjustable pickup coil matrix is a speaker's adjustable coil matrix.

6. The adjustable pickup coil matrix of claim 1, further comprising a diaphragm, and wherein said adjustable pickup coil matrix is a dynamic microphone's adjustable coil matrix.

7. The adjustable pickup coil matrix of claim 1, further comprising at least one needle, and wherein said adjustable pickup coil matrix is a phonograph cartridge adjustable coil matrix.

* * * * *